(12) United States Patent
Suzuki

(10) Patent No.: US 7,911,502 B2
(45) Date of Patent: Mar. 22, 2011

(54) DIGITAL CAMERA USING A FOCAL-PLANE SHUTTER

(75) Inventor: Shinichi Suzuki, Saitama (JP)

(73) Assignee: Hoya Corporation, Tokyo (JP)

( * ) Notice: Subject to any disclaimer, the term of this patent is extended or adjusted under 35 U.S.C. 154(b) by 659 days.

(21) Appl. No.: 11/865,164

(22) Filed: Oct. 1, 2007

(65) Prior Publication Data

US 2008/0252768 A1    Oct. 16, 2008

(30) Foreign Application Priority Data

Oct. 2, 2006    (JP) ................. 2006-270378

(51) Int. Cl.
*H04N 5/228* (2006.01)

(52) U.S. Cl. ............ 348/222.1; 348/227.1; 348/228.1; 348/229.1; 348/362

(58) Field of Classification Search ............ 348/222.1, 348/227.1–229.1, 362
See application file for complete search history.

(56) References Cited

U.S. PATENT DOCUMENTS

| 2006/0087573 | A1* | 4/2006 | Harada ............... 348/294 |
| 2007/0171293 | A1 | 7/2007 | Okamoto |
| 2007/0195170 | A1 | 8/2007 | Yamamoto et al. |
| 2007/0196091 | A1 | 8/2007 | Yamaguchi |
| 2007/0196101 | A1 | 8/2007 | Maeda |

FOREIGN PATENT DOCUMENTS

| JP | 11 234572 | 8/1999 |
| JP | 2000 180950 | 6/2000 |
| JP | 2005 348301 | 12/2005 |

OTHER PUBLICATIONS

English language Abstract of JP 11-234572.
English language Abstract of JP 2000-180950.
English language Abstract of JP 2005-348301.

* cited by examiner

*Primary Examiner* — Yogesh K Aggarwal
(74) *Attorney, Agent, or Firm* — Greenblum & Bernstein, P.L.C.

(57) ABSTRACT

A digital camera includes an image pickup device; a focal plane shutter including a shutter leading curtain and a shutter trailing curtain; a timer for measuring exposure time; a shutter controller which commences measurement of an exposure time when the shutter leading curtain starts traveling, and drives the shutter trailing curtain upon completing the exposure time measurement; and a charge readout controller which reads out electric charges accumulated by the image pickup device during the exposure time at least twice, first before the shutter trailing curtain commences traveling upon the shutter leading curtain commencing traveling and second upon the shutter trailing curtain commencing traveling. The charge readout controller carries out the electric charge readout, before the shutter trailing curtain commences traveling, at a scanning speed in synchronization with a travel speed of the shutter leading curtain in a same direction of the traveling shutter leading curtain.

10 Claims, 10 Drawing Sheets

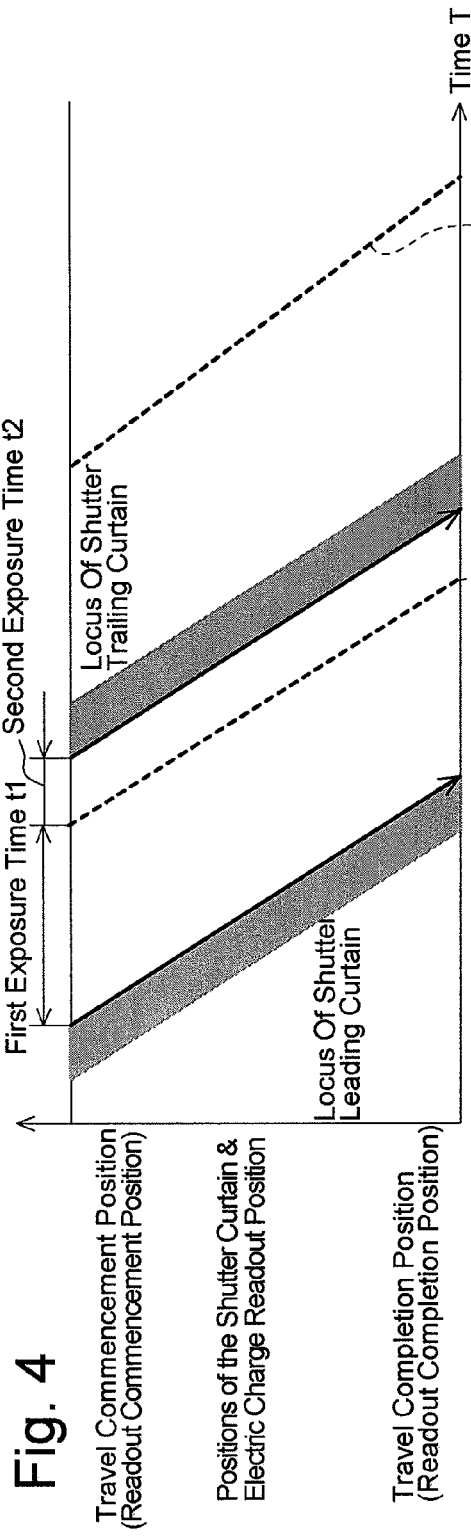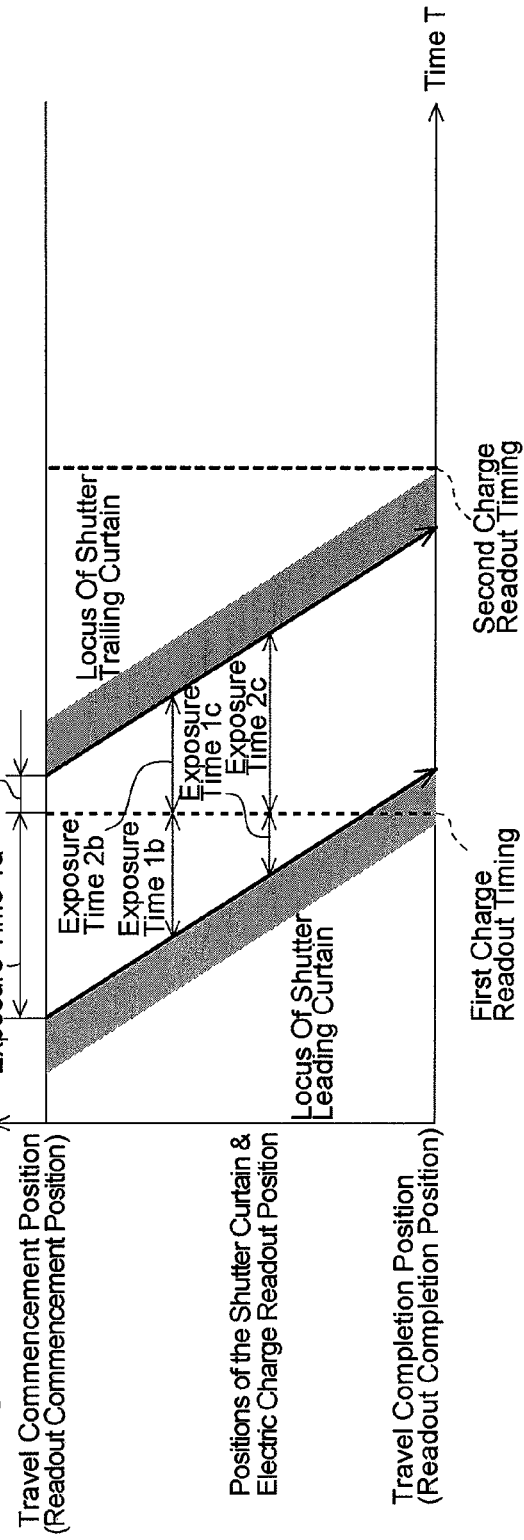

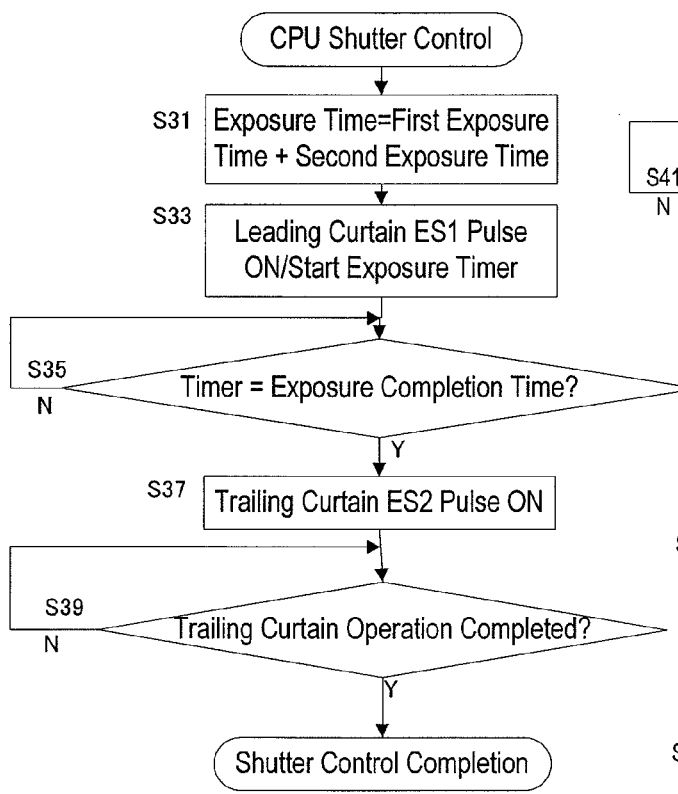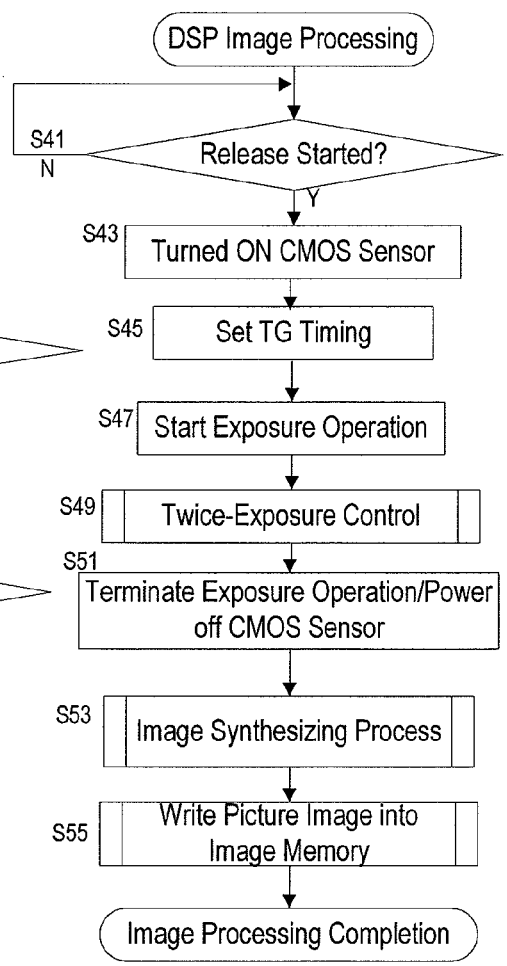

DIGITAL CAMERA USING A FOCAL-PLANE SHUTTER

BACKGROUND OF THE INVENTION

1. Field of the Invention

The present invention relates to a digital camera using a focal-plane shutter.

2. Description of the Related Art

In imaging devices such as digital cameras, it is known in the art that the dynamic range of a picture image is improved by synthesizing a plurality of images obtained at different exposures as disclosed in, e.g., Japanese unexamined patent publications H11-234572 and 2005-348301 (hereinafter referred to as patent documents 1 and 2, respectively). More specifically, in patent document 1, with the use of a full-pixel readout type of CCD image pickup device from which changes of all the pixels thereof are read out at once, a first signal charge accumulated from the commencement of accumulation of electric charge to an electric-charge readout and a second signal charge accumulated from this electric-charge readout to the moment at which the mechanical shutter is shut are obtained for synthesizing an image made by the first signal charge with another image made by the second signal charge by opening a mechanical shutter to thereupon make the CCD image pickup device start accumulating electric charge and thereafter reading out the accumulated electric charge from the CCD image pickup device in the middle of the accumulating operation thereof. On the other hand, in patent document 2, with the use of a CCD image sensor that reads out changes of all the pixels in n-fields (n being an odd number), the exposure time (exposure value) for the first field of pixels and the exposure time (exposure value) for the remaining fields of pixels are made to be different from each other to synthesize an image made by the electric charge accumulated in the first field of pixels with another image made by the electric charge accumulated in the remaining fields of pixels by controlling the operations of an electric shutter and a mechanical shutter to start exposing all fields of pixels at once and thereafter shifting the accumulated charge of the first field of pixels to the vertical charge transfer channel of the CCD image sensor in the middle of the accumulating operation thereof.

The patent documents 1 and 2 are disclosed on the precondition that a lens shutter which entirely light-shields the light receiving surface of a CCD image pickup device at the same time is used as a mechanical shutter. However, in recent years, there has been a demand for an improvement in dynamic range even in an imaging device with a focal-plane shutter, in which two shutter curtains: the shutter leading curtain (first shutter curtain) and the shutter trailing curtain (second shutter curtain) travel, in that order, perform a shutter opening/closing operation. However, if an attempt is made to read out accumulated charge from the CCD image pickup device in the middle of the accumulating operation thereof, changes accumulated in all the pixels are read out from the CCD image pickup device at once, and therefore, exposure time varies according to the pixel position of the CCD image pickup device as shown in FIG. 13 ($1a \neq 1b \neq 1c$, $2a \neq 2b \neq 2c$), so that it is impossible to obtain correct exposure.

SUMMARY OF THE INVENTION

The present invention has been devised in view of the above described problems and provides a digital camera using a focal-plane shutter, wherein, when a plurality of images of different exposure times are obtained by a single operation of the focal-plane shutter, exposure time becomes uniform across each image of the plurality of images.

The present invention has been accomplished by taking it into consideration that accumulated charges of unit cells can be selectively read out if a CMOS image sensor is used as an image sensor, and that exposure times of all unit cells can be made uniform if the timing of the readout of electric charge from each unit cell is brought into synchronization with travel of the shutter leading curtain.

According to an aspect of the present invention, a digital camera is provided, including a solid-state image pickup device which includes a two-dimensional matrix of unit cells arranged in two directions and can selectively read out electric charges accumulated in the unit cells, each of the unit cells including a photoelectric conversion element; a focal plane shutter including a shutter leading curtain and a shutter trailing curtain which move in one of the two directions; a timer which measures an exposure time; a shutter controller which commences measurement of an exposure time via the timer when the shutter leading curtain starts traveling, and drives the shutter trailing curtain upon the timer completing the measurement of the exposure time; and a charge readout controller which reads out electric charges accumulated by each unit cell of the solid-state image pickup device during the exposure time at least twice, first before the shutter trailing curtain commences traveling upon the shutter leading curtain commencing traveling and second upon the shutter trailing curtain commencing traveling. The charge readout controller carries out the electric charge readout, before the shutter trailing curtain commences traveling, at a scanning speed which is in synchronization with a travel speed of the shutter leading curtain in a same direction of the traveling shutter leading curtain.

It is desirable for the charge readout controller to set a readout timing of the solid-state image pickup device so as to vary in accordance with the travel speed of the shutter traveling curtain and to readout in a direction identical to the shutter traveling direction, and to sequentially read out the accumulated charges from the solid-state image pickup device at each row of the unit cells arranged along a direction orthogonal to the shutter traveling direction with the scanning speed being brought in synchronization with the travel speed of the shutter leading curtain.

It is desirable for the charge readout controller to include a position detector for obtaining positional information on the shutter leading curtain; and charge-readout timing tables which associate the travel speed of the shutter leading curtain with the timing. The charge readout controller sequentially reads out the accumulated charges from the solid-state image pickup device at each row of the unit cells according to one of the charge-readout timing tables which corresponds to a travel speed of the shutter leading curtain which is calculated from the positional information on the shutter leading curtain.

It is desirable for a first exposure time, in the first reading-out of the electric charges before the shutter trailing curtain commences traveling upon the shutter leading curtain commencing traveling, to be different from a second exposure time in the second reading-out of the electric charges upon the trailing curtain commencing traveling.

It is desirable for the first exposure time to be longer than the second exposure time.

It is desirable for a sum of the first exposure time and the second exposure time to be greater than a correct exposure time.

It is desirable for the digital camera to include an image synthesizing device which synthesizes a first image of the first accumulated charge with a second image of the second accumulated charge.

When reading out accumulated charges from the solid-stage imaging device upon commencement of travel of the shutter leading curtain, it is desirable for the charge readout controller to carries out the electric charge readout upon completion of the travel of the shutter trailing curtain.

It is desirable for the charge readout controller to read out the accumulated charges from the solid-state imaging device at once upon commencement of travel of the shutter trailing curtain.

It is desirable for the position detector to include a photointerrupter.

It is desirable for the solid-state image pickup device to include a CMOS image sensor.

In an embodiment, a digital camera is provided, including a solid-state image pickup device which includes a two-dimensional matrix of unit cells arranged in two directions and can selectively read out electric charges accumulated in the unit cells, each of the unit cells including a photoelectric conversion element; a focal plane shutter including a shutter leading curtain and a shutter trailing curtain which move in one of the two directions; a timer which measures at least a first exposure time and subsequently a second exposure time which are different from each other; a shutter controller which controls operations of the shutter leading curtain and the shutter trailing curtain so that the shutter leading curtain starts traveling at a commencement of measurement of the timer and so that the shutter trailing curtain starts traveling on completion of the measurement of the timer; a mid-exposure charge readout controller which sequentially reads out a first accumulated charge accumulated in each of the unit cells for the first exposure time in order of a traveling direction of the shutter leading curtain and the shutter trailing curtain wherein a scanning speed of readout of electric charge from the solid-state image pickup device is in synchronization with a travel speed of the shutter leading curtain immediately after a lapse of the first exposure time from commencement of travel of the shutter leading curtain; and a post-exposure charge readout controller which reads out a second accumulated charge accumulated in each of the unit cells for the second exposure time upon completion of the travel of the shutter trailing curtain.

According to the present invention, a digital camera in which exposure time becomes uniform across each image when a plurality of images of different exposure times are obtained by a single operation of the focal-plane shutter can be obtained.

The present disclosure relates to subject matter contained in Japanese Patent Application No. 2006-270378 (filed on Oct. 2, 2006) which is expressly incorporated herein by reference in its entirety.

BRIEF DESCRIPTION OF THE DRAWINGS

The present invention will be described below in detail with reference to the accompanying drawings in which:

FIG. 4 is a diagrammatic sketch illustrating the relationship between a timing of readout of electric charge of a synchronous readout type of CMOS image sensor and the loci of travel of the shutter leading curtain and the shutter trailing curtain;

FIG. 7 is a flow chart showing a shutter control process performed in the embodiment of the digital camera;

FIG. 8 is a flow chart showing an image processing process performed in the embodiment of the digital camera;

FIG. 13 is a diagrammatic sketch illustrating the relationship between a locus of readout of electric charge of a full-pixel readout type (conventional control type) of CCD image sensor and the loci of travel of the shutter leading curtain and the shutter trailing curtain.

DESCRIPTION OF THE PREFERRED EMBODIMENT

Figure 1A:
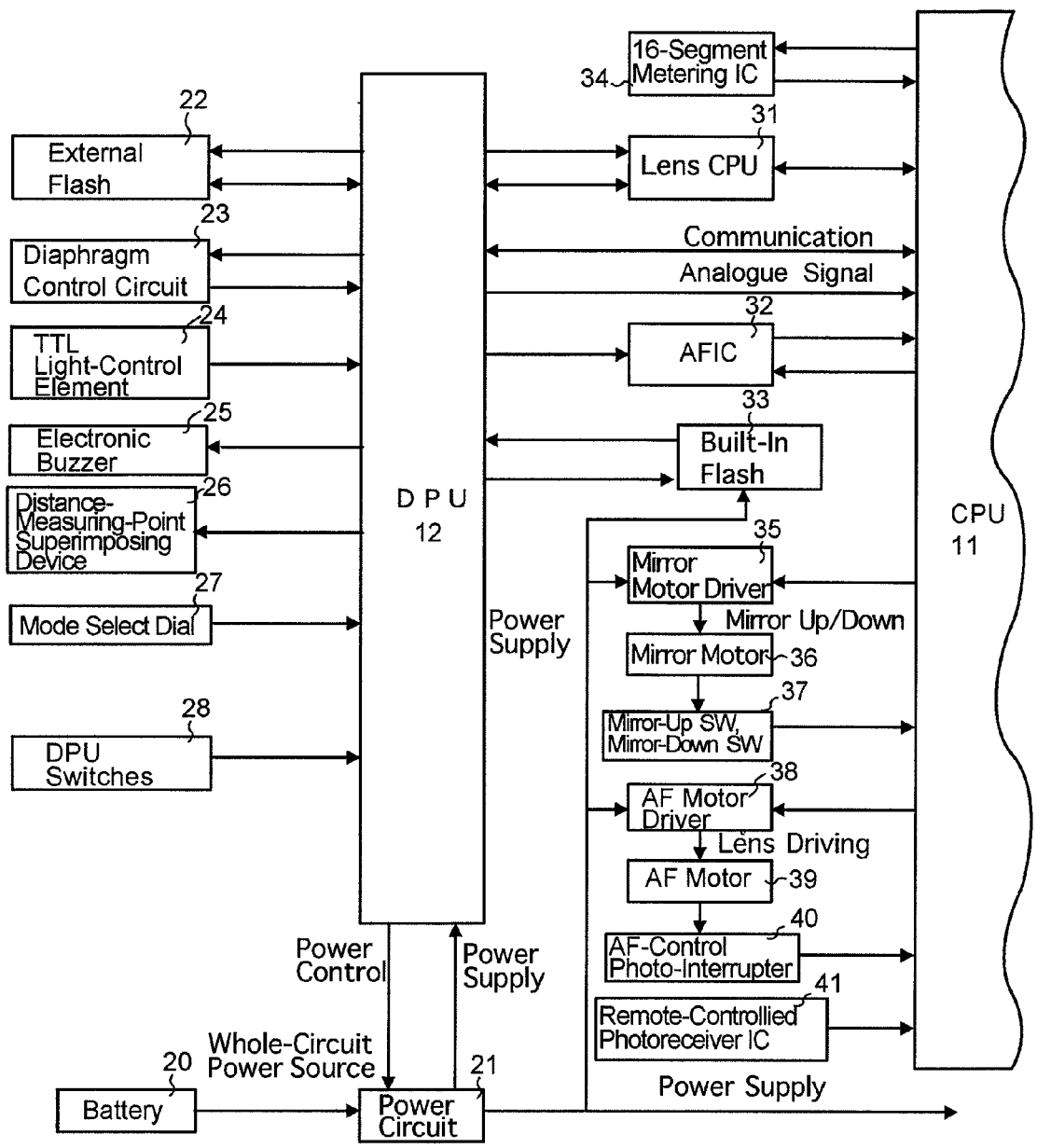
FIGS. 1A and 1B are a block diagram showing a control system of an embodiment of a digital camera according to the present invention.
Figure 1B:
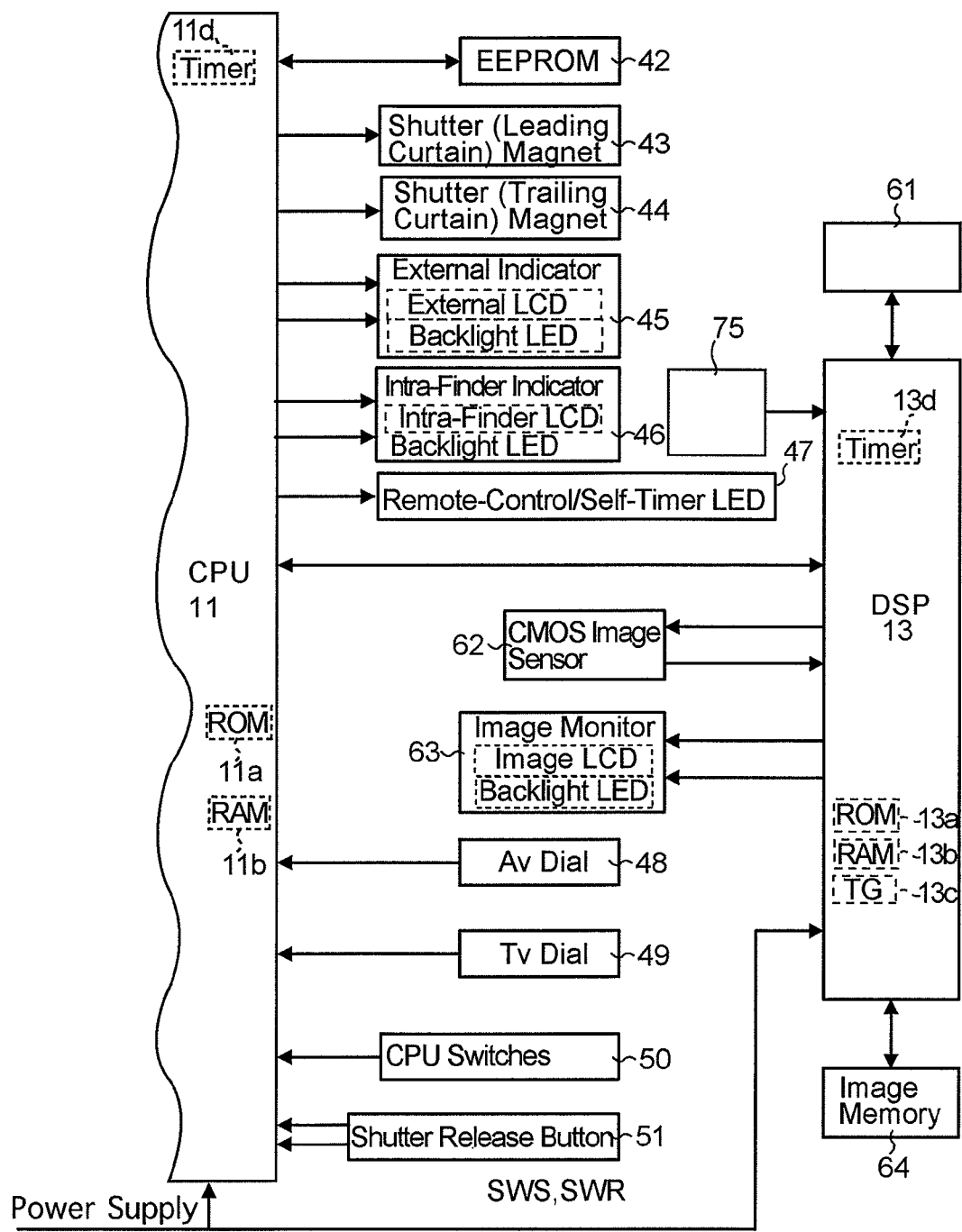

FIGS. 1A and 1B are a block diagram showing a control system of an embodiment of a digital camera according to the present invention. This digital camera is provided with a CPU (shutter controller) 11 and a DPU 12 which are connected to each other via a bus line to generally control the overall operation of the camera system including an exposure control system. The illustrated embodiment of the digital camera is a type of SLR digital camera provided with a camera body and an interchangeable photographing lens detachably attached to the camera body.

The digital camera is provided with a battery 20, a power supply circuit 21, an external flash 22 (when mounted to the body of the digital camera), a diaphragm control circuit 23, a TTL light-control element 24, an electronic buzzer 25, a distance-measuring-point superimposing device 26, a mode select dial 27, DPU switches 28, a lens CPU 31, an AFIC 32 and a built-in flash 33 which are all connected to the DPU 12. The lens CPU 31 is incorporated in a photographic lens. The DPU 12 carries out intercommunication with the CPU 11, operates by receiving control commands from the CPU 11, and sends operating status information on peripheral circuits and elements which are connected to the DPU and setting information to the CPU 11.

The battery 20 serves as a power source for driving the whole system of the digital camera. The digital camera is provided with a mirror motor driver 35, an AF motor driver 38 and a DSP (Digital Signal Processor) (image synthesizing device) 13, and the power circuit 21 supplies power of the battery 20 to the CPU 11 and the DPU 12 at all times. Additionally, based on a power control command issued by the DPU 12, the power circuit 21 controls the supply of electric power to the built-in flash 33, the mirror motor driver 35, the AF motor driver 38 and the DSP 13.

The external flash 22 is mounted to the body of the digital camera, carries out communication with the DPU 12, and discharges under control of the DPU 12. The diaphragm control circuit 23 actuates a stop-down mechanism (not shown) so that it performs a stop-down operation to stop down the diaphragm of the photographic lens based on a control signal from the DPU 12, and outputs EE pulses to the DPU 12 in synchronization with this stop-down operation. The DPU 12 senses and counts the EE pulses that the diaphragm control circuit 23 outputs, and outputs a control signal upon the number of the EE pulses thus counted reaching an EE pulse number determined by an AE calculation. Based on this control signal, the control circuit 23 stops the aforementioned stop-down mechanism to stop the stop-down operation thereof to hold an f-number of the photographic lens at a correct f-number (aperture value) Av. The TTL light-control element 24 directly receives light which is emitted from either the external flash 22 or the built-in flash 33 and reflected by an object, and outputs a reception signal of this received light to the DPU 12. The electronic buzzer 25 sounds a beep as a warning to the user based on a control signal output from the DPU 12. The distance-measuring-point superimposing device 26 is provided with a plurality of LEDs and selectively lights up the plurality of LEDs based on a control signal output from the DPU 12 to selectively indicate a plurality of distance measuring points, respectively. The mode select dial 27 is a manual operation member for manually selecting and setting various modes necessary for photography, and outputs various information such as exposure mode information, ISO sensitivity information, recording pixel (record image size) information, white balance information and remote-control mode information. The DPU switches 28 include various switches such as an AF button switch, a photometering mode lever switch and a drive mode switch, and switch information on each of these various switches is output to the DPU 12.

The lens CPU 31 is incorporated in the photographic lens (not shown), receives power via the DPU 12 and carries out communication with the DPU 12 and the CPU 11 through a group of electrical contacts provided on the mounting surface of the photographic lens. Lens data inherent in the photographic lens of the digital camera such as focal length and maximum (full-aperture) f-number and minimum f-number are stored in lens CPU 31 and are read into the DPU 12 and CPU 11 via data communication. The AFIC 32 detects a focus state of an object included in either each distance measuring area or a selected specific focus detecting area, and converts the received rays of light of the object into a video signal (electrical signal) and outputs this video signal to the CPU 11. The CPU 11 performs a distance measurement calculation based on the video signal input from the AFIC 32. The charging operation and the light-emitting operation of the built-in flash 33 are controlled by the DPU 12. The built-in flash 33 outputs a charge-completion signal to the DPU 12 upon the flash voltage reaching a predetermined charge-completion level during the charging time.

The CPU 11 is provided therein with a ROM 11a in which programs for functions of the digital camera are written, a RAM 11b in which various parameters and lens information are temporarily stored, and an exposure timer 11d which measures the exposure time, i.e., the amount of time from the beginning of the movement of the shutter leading-curtain. In addition to the lens CPU 31 and the AFIC 32, the digital camera is further provided with a 16-segment metering IC 34, a mirror motor driver 35, a mirror switch (mirror-up/mirror-down switch) 37, the aforementioned AF motor driver 38, AF-control photo-interrupter 40, a remote-controlled photo-receiver IC 41, an EEPROM 42, a shutter leading curtain magnet 43, a shutter trailing curtain magnet 44, an external indicator 45, an intra-finder indicator 46, a remote-control/ self-timer LED 47, an Av dial 48, a Tv dial 49, a CPU-side switches 50, a shutter release button 51 and a DSP 13, which are all connected to the CPU 11.

The 16-segment metering IC 34 can measure the intensity of light incident on each metering area, and outputs an electrical signal responsive to the amount of light received by the metering area to the CPU 11 as object brightness information Bv for each metering area selected by a sensor selecting signal output from the CPU 11. The CPU 11 performs an exposure calculation using information such as object brightness information Bv and ISO sensitivity information to determine an optimum exposure value Ev, an optimum shutter speed Tv and an optimum f-number Av. The CPU 11 calculates the number of EE pulses corresponding to the optimum f-number Av which are output from the diaphragm control circuit 23 in conjunction with the stop-down operation of the stop-down mechanism (not shown).

The mirror motor driver 35 controls the operation of the mirror motor 36 based on a mirror driving signal from the CPU 11 to move up or down a quick-return mirror (not shown). The CPU 11 detects whether or not the quick-return mirror currently lies in a mirror-up position or a mirror-down position via a switch state (mirror position signal) of the mirror switch 37. The AF motor driver 38 controls the operation of the AF motor based on an AF driving signal from the CPU 11 to move a focusing lens system (e.g., focusing lens group) of the photographic lens to an in-focus position by the AF motor 39. The AF-control photo-interrupter 40 outputs AF pulses to the CPU 11 in conjunction with rotation of the AF motor 39, and the CPU 11 stops the driving of the AF motor 39 via the AF motor driver 38 upon the number of the AF pulses output from the AF-control photo-interrupter 40 reaching an AF pulse number determined by the aforementioned distance measurement calculation. The remote-controlled photoreceiver IC 41 receives a release command from a supplied remote controller (not shown) which comes with the digital camera, and outputs a release signal to the CPU 11 upon receipt of the release command from the supplied remote controller during a predetermined standby time. The EEPROM 42 serves as a memory in which various data on adjustments, in accordance with the photographing operation and the individual camera, are stored. The CPU 11 reads out such various data from the EEPROM 42 as appropriate.

While energized, the shutter leading curtain magnet (ESMg1) 43 and the shutter trailing curtain magnet (ESMg2) 44 lock a shutter leading curtain 73 and a shutter trailing curtain 74 of a shutter unit (focal-plane shutter) 70 by electromagnetic forces, respectively. Upon the passage of current through the shutter leading curtain magnet 43 and the shutter trailing curtain magnet 44 being stopped, the shutter leading curtain magnet 43 and the shutter trailing curtain magnet 44 release the electromagnetic engagements with the shutter leading curtain 73 and the shutter trailing curtain 74 to move the shutter leading curtain 73 and the shutter trailing curtain 74, respectively. The CPU 11 controls movements (drives/travels) of the shutter leading curtain 73 and the shutter trailing curtain 74 by passing or not passing current through the shutter leading curtain magnet 43 and the shutter trailing curtain magnet 44, respectively.

Each of the external indicator 45 and the intra-finder indicator 46 is an LCD device for visually indicating various pieces of photographic information and is provided with an LCD panel which indicates such information (e.g., in the form of segments of a liquid crystal) and an LED which backlights the LCD panel. The remote-control/self-timer LED 47 lights up by control of the CPU 11 to inform the user of the timing of a shutter release upon receiving a release command from the remote controller or during the operation of a self timer in a self-timer exposure mode.

The Av dial 48 is a manual operation member for mainly setting an f-number of the photographic lens and the Tv dial 49 is a manual operation member for manually setting a shutter speed. Various pieces of information set by the Av dial 48 and the Tv dial 49 are output to the CPU 11. The CPU-side switches 50 include various switches such as a main switch SWM for turning ON the main power source of the digital camera and a lid switch which detects the open/closed state of the lid for covering an insert/eject opening of an image memory 64. The shutter release button 51 is a two-step switch including a photometric switch SWS and a release switch SWR which are turned ON when the shutter release button 51 is half and fully depressed, respectively.

The power to the DSP 13 is controlled by the DPU 12 and the power supply circuit 21. While being supplied with power, the DSP 13 carries out communication with the CPU 11 to carry out image processing based on a control signal and various pieces of information from the CPU 11. The DSP 13 is provided therein with a ROM 13a in which control programs and the like are written, a RAM 13b which temporarily stores various pieces of information and a timing generator 13c which generates the internal timing signals for control.

The digital camera is provided with a flash memory 61, a CMOS image sensor (solid-state image pickup device) 62, an image monitor 63, the aforementioned image memory 64 and a charge-readout-control photo-interrupter 75 which are electrically connected to the DSP 13. The DSP 13 and the readout-control photo-interrupter 75 constitute a (mid-exposure/post-exposure) charge readout controller. Control programs (firmware) for the DSP 13 and the like are written in the flash memory 61. The DSP 13 performs various image processes on the image signal read out from the CMOS image sensor 62 to generate a picture image which can be indicated on the image monitor 63. The picture image thus generated is stored in the image memory 64. The DSP 13 loads image data from the image memory 64 to indicate an image of this image data on the image monitor 63. The image monitor 63 is composed of an image LCD and a lighting LED which backlights the image LCD. For instance, the image monitor 63 is installed to the back of the digital camera. The image memory 64 is a removable memory that can be freely inserted into and withdrawn from the digital camera. A flash memory, a micro hard disk or the like can be used as the image memory 64.

Figure 12:
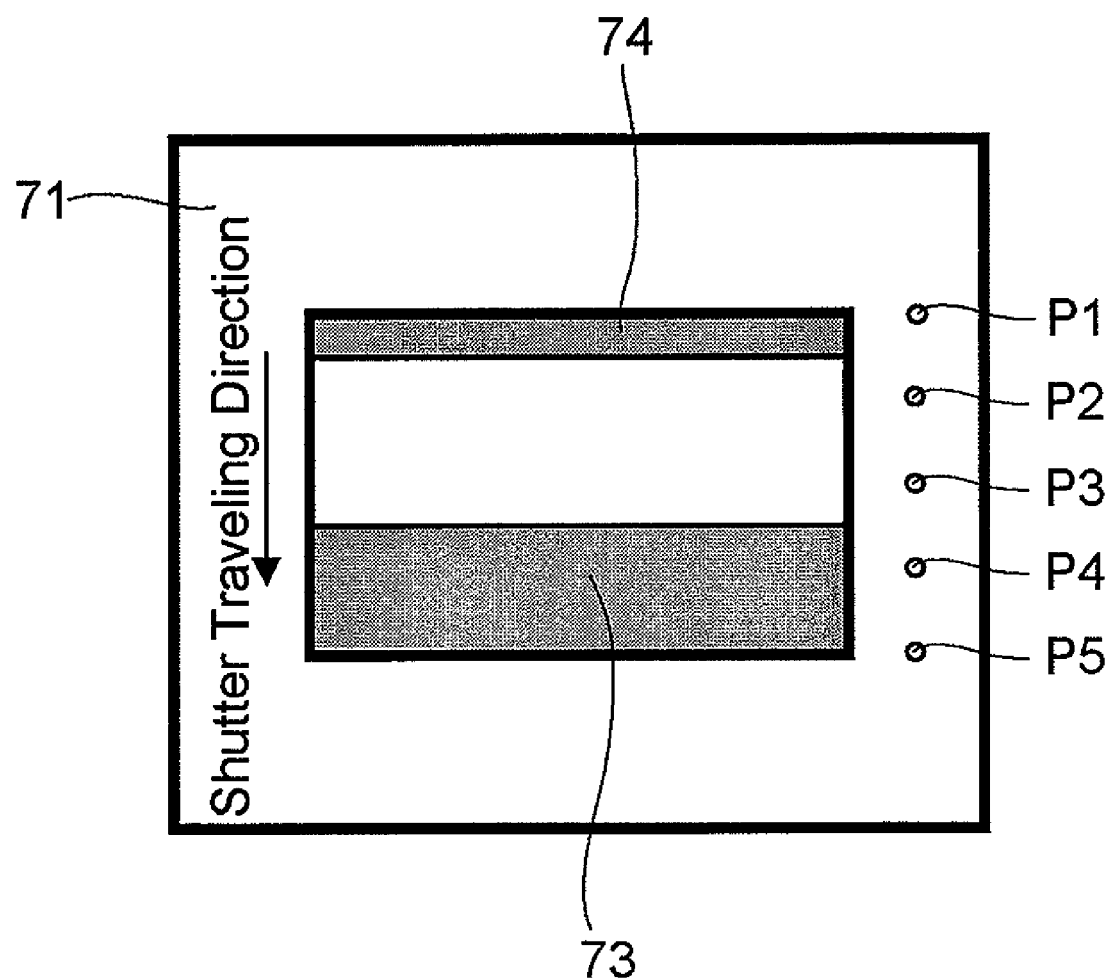
FIG. 12 is a schematic plan view of the shutter leading curtain, the shutter trailing curtain and a shutter support frame of the shutter unit, showing detecting positions of the shutter leading curtain.

The charge-readout-control photo-interrupter 75 outputs pulses in conjunction with travel of the shutter leading curtain 73, and the DSP 13 detects the position and the traveling speed of the shutter leading curtain 73 based on pulses output from the charge-readout-control photo-interrupter 75. The present embodiment of the digital camera is provided therein with a shutter support frame 71 which supports the shutter leading curtain 73 and the shutter trailing curtain 74 in a manner to allow the shutter leading curtain 73 and the shutter trailing curtain 74 to move. As shown in FIG. 12, the shutter support frame 71 is provided, between the travel commencement position and the travel completion position of the shutter leading curtain 73 along the shutter traveling direction (from top to bottom in the vertical direction with respect to FIG. 12), with a series of five sensing holes for position detection the positions of which are defined as first through fifth shutter positions P1, P2, P3, P4 and P5, respectively, in that order in the shutter traveling direction. Each time an edge (leading edge) 73a of the shutter leading curtain 73 passes each of the first through fifth shutter positions, the charge-readout-control photo-interrupter 75 outputs a pulse. The DSP 13 updates a shutter position flag each time inputting a pulse from the charge-readout-control photo-interrupter 75, and detects the current position of the shutter leading curtain 73 from this shutter position flag. The shutter position flag is cleared when the edge 73a of the shutter leading curtain 73 is positioned between the travel commencement point thereof and the first shutter position P1. The shutter position flag is set to P1, P2, P3 and P4 when the edge 73a of the shutter leading curtain 73 is positioned between the first and second positions P1 and P2, between the second and third positions P2 and P3, between the third and fourth positions P3 and P4, and between the fourth and fifth positions P4 and P5, respectively. The shutter position flag is set to P5 when the edge 73a of the shutter leading curtain 73 is positioned at the fifth position (travel completion position).

In the digital camera that has the above described general structure, the DSP 13 reads out two images (accumulated charge in each unit cell) of different exposure times from the CMOS image sensor 62 by a single shutter release operation (from the commencement of travel of the shutter leading curtain 73 to the completion of travel of the shutter trailing curtain 74) of the shutter unit 70, and synthesizes the two images to create a picture image with an improved dynamic range. The present embodiment of the digital camera is characterized by the charge readout control of the CMOS image sensor 62 and shutter control, and these controls will be hereinafter discussed in detail with reference to FIGS. 2 through 4.

Figure 2:
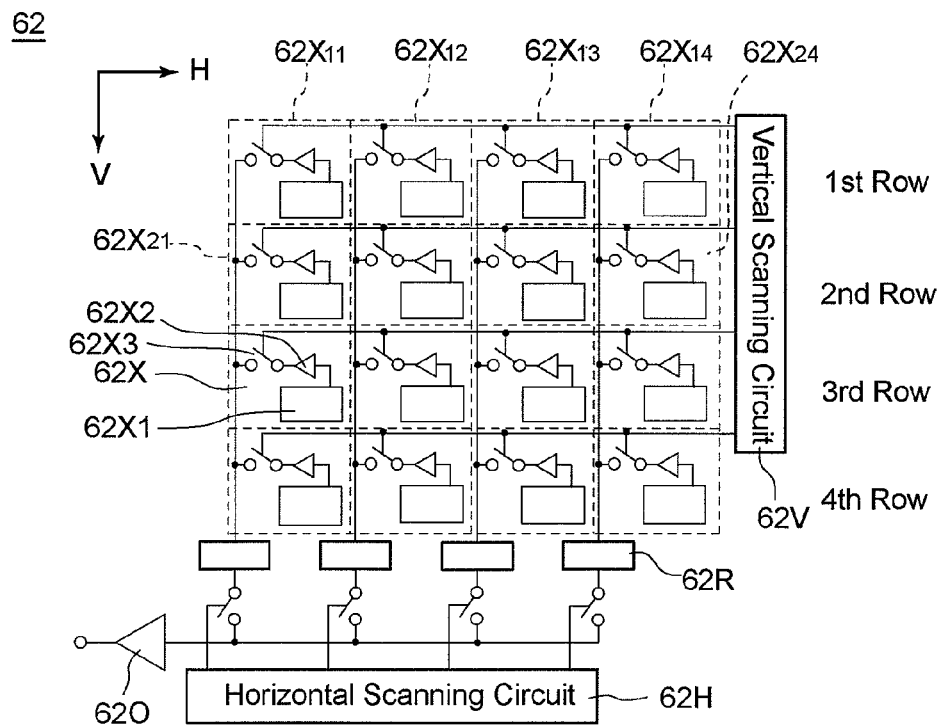
FIG. 2 is a schematic circuit diagram showing an example of the CMOS image sensor shown in FIG. 1B.
Figure 3:
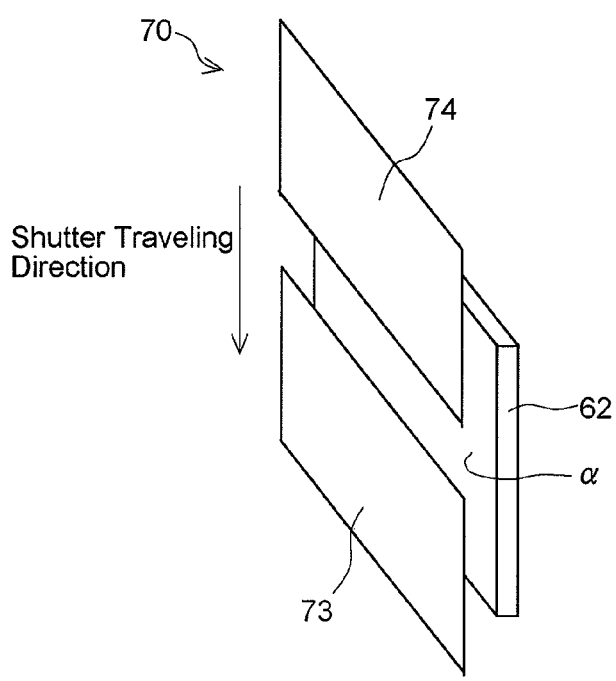
FIG. 3 is a diagrammatic sketch showing an example of the configuration of the CMOS image sensor and a shutter unit.

FIG. 2 shows an example of the CMOS image sensor 62 and FIG. 3 shows an example of the configuration of the CMOS image sensor 62 and the shutter unit 70.

The CMOS image sensor 62 is positioned behind the shutter unit 70 as shown in FIG. 3 and receives light (object image) from the photographic lens through a slit formed between the shutter leading curtain 73 and the shutter trailing curtain 74. The CMOS image sensor 62 is an X-Y address type of solid-state image pickup device which makes a high-speed charge readout operation possible. More specifically, as shown in FIG. 2, the CMOS image sensor 62 is provided with a large number of unit cells 62X arranged in a two-dimensional matrix, i.e., rows and columns of unit cells 62X arranged in the horizontal direction H and the vertical direction V (horizontal and vertical directions with respect to FIG. 2) of a light-receiving sensor surface a of the CMOS image sensor 62, respectively. The CMOS image sensor 62 is further provided with a horizontal-direction scanning circuit 62H which selects the unit cells 62X in the horizontal direction H, a vertical-direction scanning circuit 62V which selects the unit cells 62X in the vertical direction V, a plurality of column circuits 62R respectively provided as noise filters for a corresponding plurality of columns of unit cells 62X, and an output portion 62O which sequentially outputs accumulated charges of the unit cells 62X which are selectively read out by the horizontal-direction scanning circuit 62H and the vertical-direction scanning circuit 62V to the DSP 13. Each unit cell 62X is composed of a photoelectric conversion element 62X1 which coverts the incident light into electric charge to accumulate this electric charge, an amplifier 62X2 which amplifies the electric charge accumulated by the associated photoelectric conversion element 62X1 and a switch 62X3 for outputting the accumulated electric charge amplified by the amplifier 62X2. The accumulated charge amplified by each amplifier 62X2 is output upon the associated unit cell 62X being selected by the horizontal-direction scanning circuit 62H and the vertical-direction scanning circuit 62V to be sent to the output portion 62O via the associated column circuit 62R. The DSP 13 drives the horizontal-direction scanning circuit 62H and the vertical-direction scanning circuit 62V according to a control signal (timing pulse for readout of electric charge) to perform the charge readout control of the CMOS image sensor 62. Although only a matrix with four rows and four columns of the unit cells 62X, i.e., only sixteen unit cells 62X are shown in FIG. 3 for the purpose of simplification of the drawing, the CMOS image sensor 62 actually includes a large number of unit cells 62X.

As described above, the shutter leading curtain 73 and the shutter trailing curtain 74 of the shutter unit 70 are held in the initial positions (travel commencement positions) thereof by the electromagnetic forces of the shutter leading curtain magnet 43 and the shutter trailing curtain magnet 44, respectively. When the shutter leading curtain 73 and the shutter trailing curtain 74 are in the respective initial positions thereof, the shutter leading curtain 73 totally covers the light-receiving sensor surface a of the CMOS image sensor 62 while the shutter trailing curtain 74 is positioned above the shutter leading curtain 73. The shutter leading curtain 73 and the shutter trailing curtain 74 travel downward with respect to FIG. 3 (i.e., in the vertical direction of the light-receiving sensor surface a of the CMOS image sensor 62) upon release of electromagnetic engagements of the shutter leading curtain magnet 43 and the shutter trailing curtain magnet 44 with the shutter leading curtain 73 and the shutter trailing curtain 74, respectively. When the shutter leading curtain 73 and the shutter trailing curtain 74 are in the respective travel completion positions thereof, the shutter leading curtain 73 is positioned below the light-receiving sensor surface $\alpha$ so as not to cover the light-receiving sensor surface $\alpha$ while the shutter trailing curtain 74 is positioned immediately in front of the light-receiving sensor surface $\alpha$ to totally cover the light-receiving sensor surface $\alpha$. Exposure of the CMOS image sensor 62 to light starts at the commencement of travel of the shutter leading curtain 73 and subsequently completes at the commencement of travel of the shutter trailing curtain 74.

FIG. 4 is a diagrammatic sketch illustrating the relationship between the timing of readout of electric charge from the CMOS image sensor 62 and the loci of travel of the shutter leading curtain 73 and the shutter trailing curtain 74. In FIG. 4, the left and right oblique solid lines represent the locus of travel of the shutter leading curtain 73 and the locus of travel of the shutter trailing curtain 74, respectively, and the left and right oblique broken lines represent the first timing of readout of electric charge from the CMOS image sensor 62 and the second timing of readout of electric charge from the CMOS image sensor 62, respectively. In FIG. 4, the vertical axis represents the positions of the shutter leading curtain 73 and the shutter trailing curtain 74 in the shutter traveling direction and the readout position at which electric charge is read out from the CMOS image sensor 62, and the horizontal direction represents the lapse of time.

The DSP 13 sets a first exposure time t1 and a second exposure time t2 which are different from each other and controls the timing of readout of electric charge from the CMOS image sensor 62 to obtain the first accumulated charge and the second accumulated charge which are accumulated in the CMOS image sensor 62 for the first exposure time t1 and the second exposure time t2, respectively. In the present embodiment of the digital camera, an exposure mode in which the first accumulated charge and the second accumulated charge that are respectively accumulated for the first exposure time t1 and the second exposure time t2 are obtained by a single shutter release operation is referred to as a "twice-exposure mode." The total time of the first exposure time t1 and the second exposure time t2 is identical to the time from the commencement of travel of the shutter leading curtain 73 to the commencement of travel of the shutter trailing curtain 74.

Exposure of the CMOS image sensor 62 to light starts at the commencement of travel of the shutter leading curtain 73. Given this fact, a time lag occurs between the exposure starting times of the rows of unit cells 62X of the CMOS image sensor 62 as clearly seen from FIG. 4 because the shutter leading curtain 73 travels in the direction (vertical direction) from top to bottom of the light-receiving sensor surface $\alpha$ of the CMOS image sensor 62. Therefore, if accumulated charge is simply read out from the CMOS image sensor 62 immediately after a lapse of the first exposure time t1 from the commencement of travel of the shutter leading curtain 73, exposure times of the unit cells 62X become mutually different, which makes it impossible to obtain a correct image signal.

To prevent this problem from occurring, the DSP 13 controls the timing of readout of electric charge from the CMOS image sensor 62 in association with travel of the shutter leading curtain 73 so that the exposure times of all the unit cells 62X become uniform. More specifically, immediately after a lapse of the first exposure time t1 (t1<T) from the commencement of travel of the shutter leading curtain 73, a charge readout operation for reading out accumulated charge from the CMOS image sensor 62 starts. T designates the total exposure time which is usually set to either the correct exposure time or to a longer time than the correct exposure time. In this charge readout operation, accumulated charges are sequentially read out from the CMOS image sensor 62 at each row of unit cells 62X row by row from the first row of unit cells 62X to the fourth row of unit cells 62X in order of a direction identical to the shutter traveling direction (from top to bottom in the vertical direction with respect to FIG. 3). The timing of readout of accumulated charge from each unit cell 62X is brought into synchronization with the travel of the shutter leading curtain 73 for each row of unit cells 62X. In other words, the timing of the readout of the accumulated charge from each unit cell 62X varies in accordance with the travel speed of the shutter leading curtain 73 and are read out in the same direction as the shutter traveling direction. As for each row of unit cells 62X, accumulated charge is sequentially read out from the unit cells 62X from the side closer to the output portion 62O.

If an example of a charge readout order is illustrated with reference to FIG. 2, firstly accumulated charges are read out from the unit cells 62X on the top row (first row along the horizontal direction) in order from the unit cell 62X$_{11}$ at the left end of the first row to the unit cell 62X$_{14}$ at the right end of the first row, and subsequently accumulated charges are read out from the unit cells 62X on the second top row (second row along the horizontal direction) in order from the unit cell 62X$_{21}$ at the left end of the second row to the unit cell 62X$_{24}$ at the right end of the second row. Subsequently, in a like manner, accumulated charges are read out from the unit cells 62X on the third row and thereafter on the fourth row.

If the timing of readout of electric charge from each unit cell 62X is brought into synchronization with travel of the shutter leading curtain 73 for each row of unit cells 62X in such a manner, the locus of travel of the shutter leading curtain 73 and the timing of readout of electric charge from the CMOS image sensor 62 become parallel lines as clearly illustrated in FIG. 4, so that the exposure times of the unit cells 62X from the exposure starting time to the timing of the readout of the electric charge (first exposure time t1) all become uniform. Thereby the DSP 13 obtains the first accumulated charge that the photoelectric conversion element 62X1 of each unit cell 62X accumulates for the first exposure time t1.

At each unit cell 62X, the second exposure starts synchronously upon the completion of the first exposure for the first exposure time t1 by the above described readout of the first accumulated charge. The shutter trailing curtain 74 starts traveling immediately after a lapse of the second exposure time t2 from the moment at which the first exposure time t1 elapses, which completes the exposure of the CMOS image sensor 62. A time lag also occurs between the exposure termination times of the rows of unit cells 62X of the CMOS image sensor 62 as clearly seen from FIG. 4 because the shutter trailing curtain 74 travels in the direction (vertical direction) from top to bottom of the light-receiving sensor surface α of the CMOS image sensor 62. The first charge readout timing shown in FIG. 4 represents both the completion of the first exposure of each unit cell 62X of the CMOS image sensor 62 and the commencement of the second exposure of the each unit cell 62X of the CMOS image sensor 62, and is also parallel to the locus of travel of the shutter trailing curtain 74. Therefore, exposure times of all the unit cells 62X from the second exposure starting time to the second exposure termination time also become uniform (the aforementioned second exposure time t2). The DSP 13 sequentially reads out accumulated charge of each unit cell 62X upon completion of travel of the shutter trailing curtain 74 to obtain the second accumulated charge that the photoelectric conversion element 62X1 of each unit cell 62X accumulates for the second exposure time t2. Since the second accumulated charge is sequentially read out regardless of the travel speed of the shutter leading curtain 73 or the shutter trailing curtain 74 as just described, the right oblique broken line shown in FIG. 4 that represents the second charge readout timing is not parallel to either the left oblique broken line shown in FIG. 4 that represents the first charge readout timing or the loci of travel of the shutter leading curtain 73 and the shutter trailing curtain 74. Note that since the readout of the second accumulated charge is carried out after the CMOS image sensor 62 is shielded by the shutter trailing curtain 74, the timing of the timing of the loci of travel thereof is not limited to that shown in FIG. 4.

The ratio between the first exposure time t1 and the second exposure time t2 can be set as appropriate. If this ratio is set at a ratio of 10 to 1, two images have exposure levels which are mutually different by ten times are obtained, and accordingly, the dynamic range is greatly improved by synthesizing these two images. In the present embodiment of the digital camera, the second exposure time t2 is set to be shorter than the first exposure time t1. Although the CMOS image sensor 62 is exposed to light by the second exposure even during readout of the first exposure signal and accordingly this light exerts a slight influence upon the first exposure signal, the second exposure signal is not influenced by such light when the second exposure signal is read out because the CMOS image sensor 62 is light-shielded by the shutter curtains. Therefore, such an adverse influence can be reduced to minimum by increasing the signal level of the first exposure signal, upon which the aforementioned light exerts a slight influence, by lengthening the exposure time, and further by shortening the second exposure time.

It is desirable to set a correct exposure time T which does not exceed the sum of the first exposure time t1 and the second exposure time t2. However, if one of the first exposure time t1 and second exposure time t2 is set to a longer exposure time than the correct exposure time T and the other thereof is set to a short exposure time, overexposure (i.e., loss in detail of highlight exposure) can be prevented during the shorter exposure time of the first and second exposure times t1 and t2, and underexposure (i.e., loss in detail of shadow exposure) can be prevented during the longer exposure time of the first and second exposure times t1 and t2. The general process of the present embodiment of the digital camera will be hereinafter discussed in detail with reference to FIGS. 5 through 12.

Figure 5:
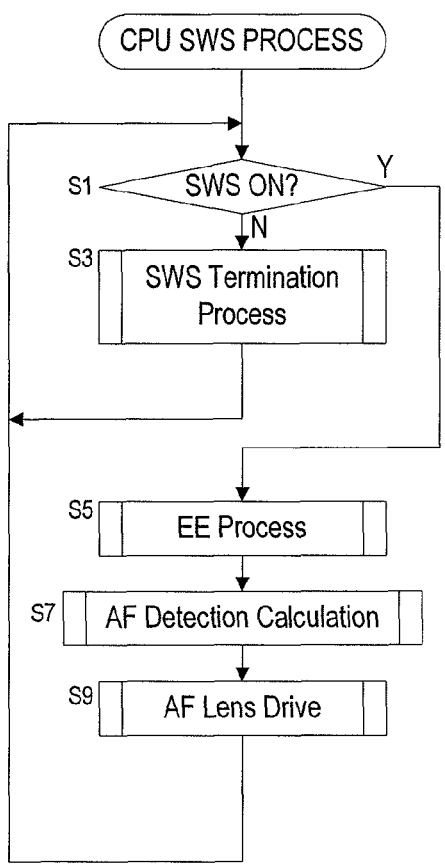
FIG. 5 is a flow chart showing a photometric SW process performed in the embodiment of the digital camera.
Figure 6:
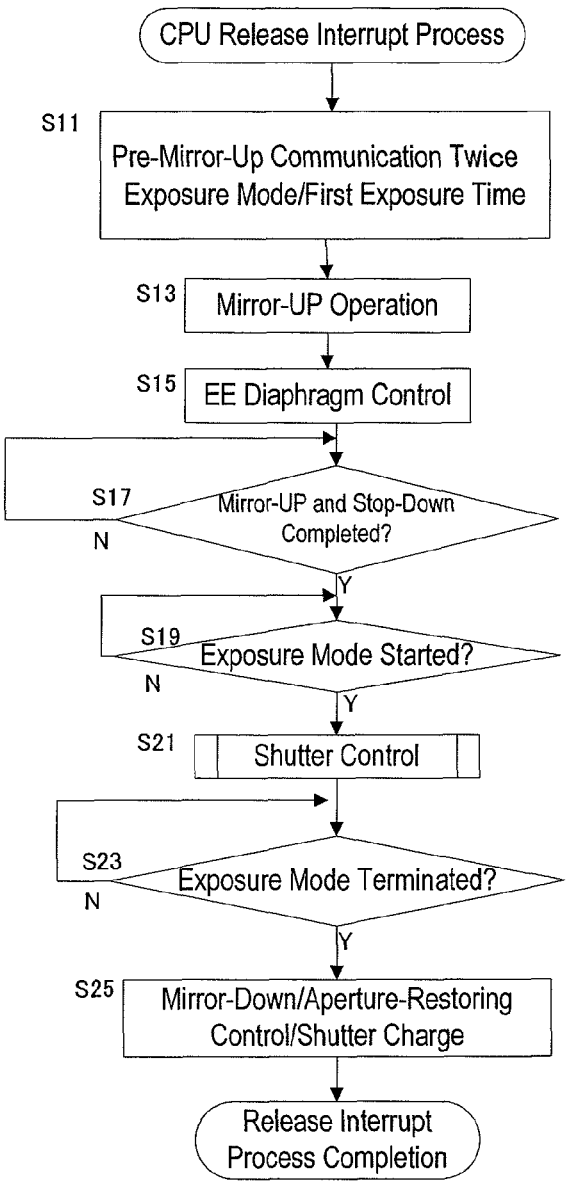
FIG. 6 is a flow chart showing a release interrupt process performed in the embodiment of the digital camera.
Figure 9:
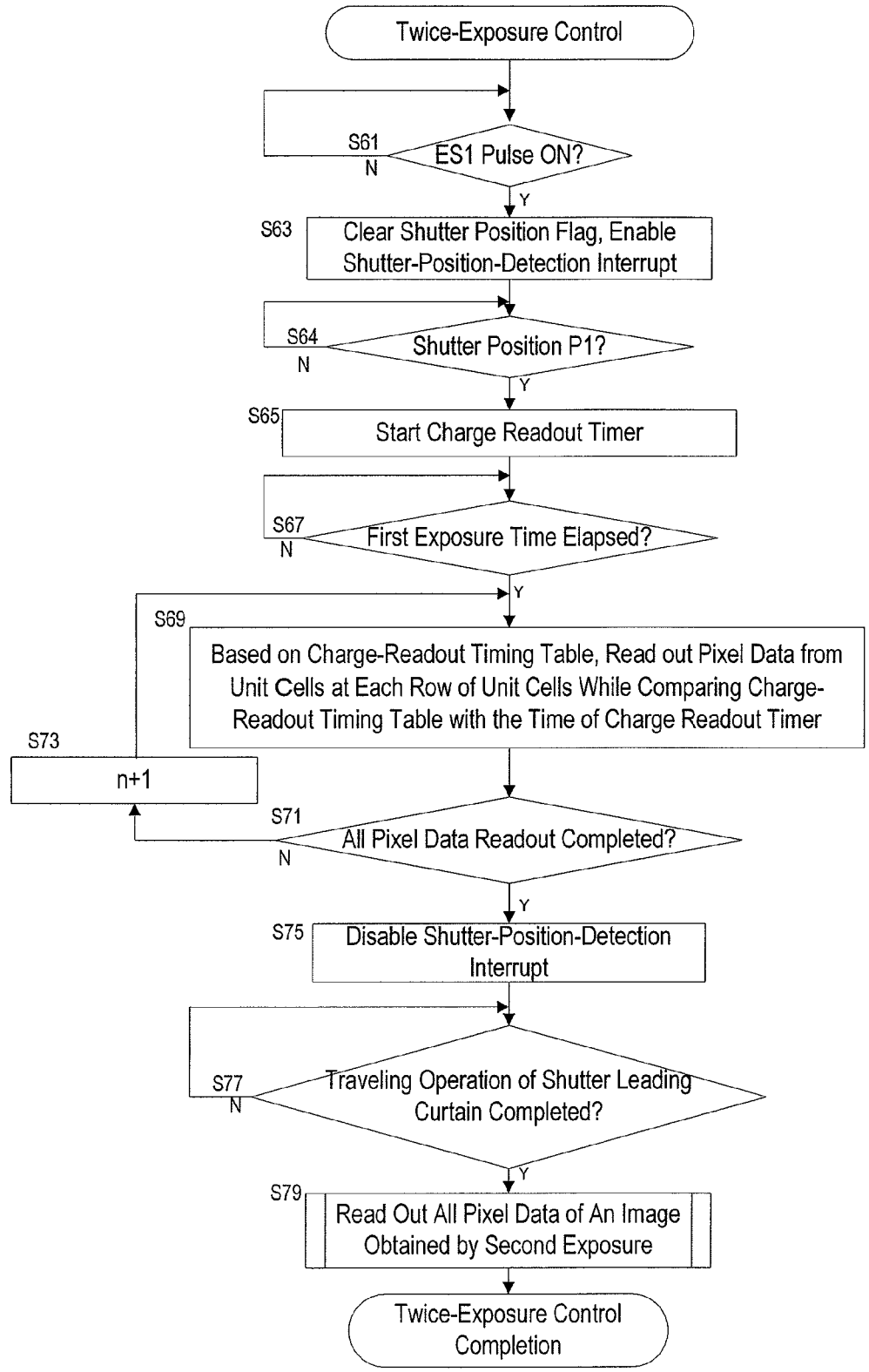
FIG. 9 is a flow chart showing a twice-exposure control process performed in the embodiment of the digital camera.
Figure 10:
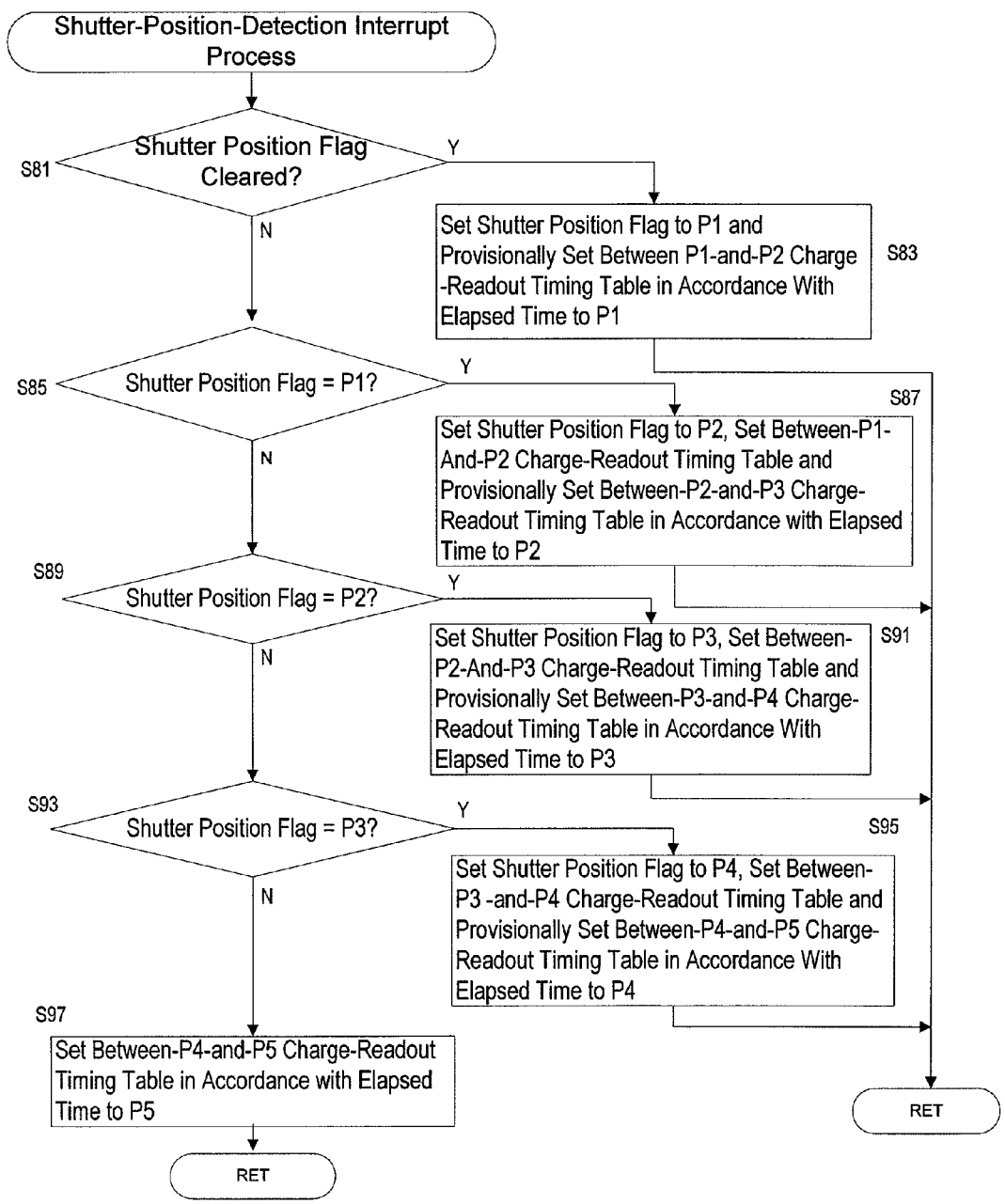
FIG. 10 is a flow chart showing a shutter-position-detection interrupt process performed in the embodiment of the digital camera.
Figure 11:
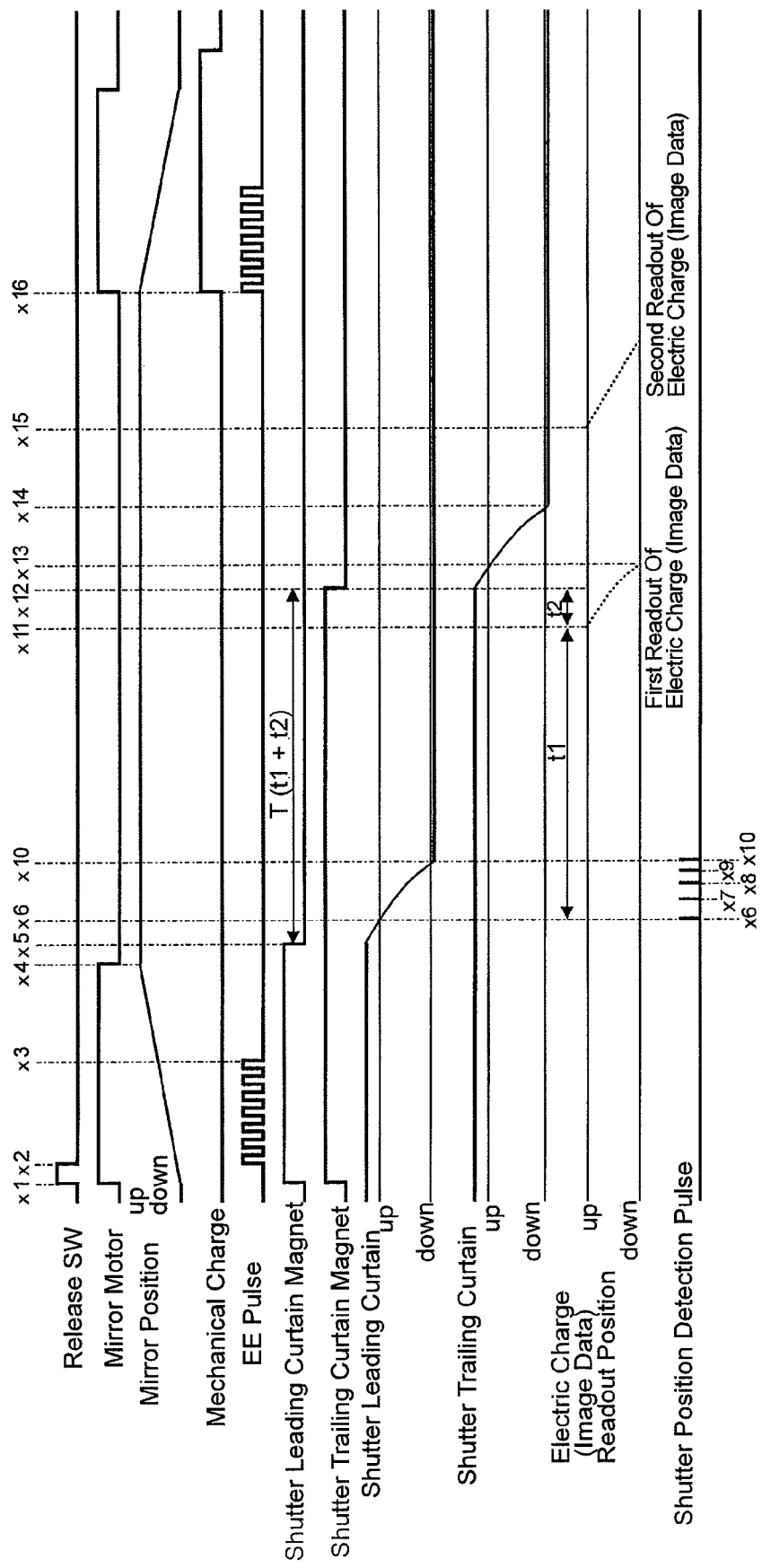
FIG. 11 is a timing chart showing various operations associated with a release operation of the embodiment of the digital camera.

FIGS. 5 through 7 show flow charts for various processes controlled by the CPU 11 based on programs written in the ROM 11*a* and FIGS. 8 through 10 show flow charts for various processes controlled by the DSP 13 based on programs written in the ROM 13*a*. FIG. 11 is a timing chart showing various operations associated with a release operation of the present embodiment of the digital camera. FIG. 12 is a schematic plan view of the shutter leading curtain 73, the shutter trailing curtain 74 and the shutter support frame 71 of the shutter unit 70, showing detecting positions of the shutter leading curtain 73.

FIG. 5 shows a flow chart showing a photometric SW process. The photometric SW process is controlled by the CPU 11 based on a program written in the ROM 11*a*, and is carried out when the main power of the digital camera is ON (when the main switch SWM is ON).

In the photometric SW process, firstly it is determined whether or not the photometric switch SWS is ON (step S1). If the photometric switch SWS is not ON (if NO at step S1), a SWS termination process is performed (step S3). In the SWS termination process, an indication of the start of asleep timer is visually indicated on each of the external indicator 45 and the intra-finder indicator 46, and thereafter control proceeds to a CPU sleep state. During the OFF state of the photometric switch SWS, the operations at steps S1 and S3 are repeated.

If it is determined that the photometric switch SWS is ON (if YES at step S1), an EE process (step S5), an AF detection calculating process (step S7) and an AF lens drive process (step S9) are carried out, and thereafter control returns to step S1. In the EE process at step S5, object brightness information Bv is input from the 16-segment metering IC 34 to calculate a correct exposure value Ev, a correct shutter speed Tv and a correct f-number Av via an exposure calculation using the object brightness information Bv; and additionally, the number of EE pulses corresponding to the correct f-number Av is calculated. The EE pulses are output from the diaphragm control circuit 23 in conjunction with the stop-down operation of the stop-down mechanism (not shown) as mentioned above. In the AF detection calculating process at step S7, a distance measurement calculation based on the video signal input from the AFIC 32 is carried out to calculate a lens driving amount for moving the focusing lens system of the photographic lens to an in-focus position and an AF pulse number corresponding to this lens driving amount. In the AF lens drive process at step S9, the AF motor 39 is driven via the AF motor driver 38, and rotation of the AF motor 39 is stopped via the AF motor driver 38 upon the number of the AF pulses output from the AF-control photo-interrupter 40 reaching an AF pulse number calculated at step S7. Due to this control, the focusing lens system of the photographic lens is moved to an in-focus position.

FIG. 6 is a flow chart showing a release interrupt process that is performed upon the release switch SWR being turned ON (during the loop process from step S1 to step S9 via steps S5 and S9 in the photometric SW process shown in FIG. 5).

Immediately after the release switch SWR is turned ON, firstly the CPU 11 carries out a pre-mirror-up communication with the DSP 13 and brings a mirror-up operation which is performed by the mirror motor driver 35 and the mirror motor 36 into operation (steps S11 and S13; time x1 in FIG. 11). In the pre-mirror-up communication, the CPU 11 informs the DSP 13 that exposure is controlled in the aforementioned twice-exposure mode and further informs the DSP 13 of exposure control information including information on the first exposure time t1. As mentioned above, the twice-exposure mode is an exposure mode in which the first accumulated charge and the second accumulated charge that are respectively accumulated for the first exposure time t1 and the second exposure time t2, and are obtained by a single shutter release operation.

Subsequently, the diaphragm (e.g., electromagnetic iris diaphragm) of the photographic lens is stopped down to the correct aperture value calculated in the EE process at step S5 via the DPU 12 and the diaphragm control circuit 23 (step S15). Immediately after the stop-down operation of the photographic lens starts, EE pulses are output from the diaphragm control circuit 23 in conjunction with the stop-down operation of the photographic lens (time x2 in FIG. 11). The DPU 12 counts the EE pulses output from the diaphragm control circuit 23 and subsequently outputs a control signal to the CPU 11 upon the count reaching the EE pulse number corresponding to the correct aperture value Av.

Thereafter, it is determined whether or not the mirror-up operation at step S13 and the stop-down operation at step S15 have completed (step S17). If at least one of the mirror-up operation and the stop-down operation has not yet completed (if NO at step S17), control repeats the operation at step S17 to wait for both the mirror-up operation and the stop-down operation to complete. The CPU 11 detects whether or not the mirror-up operation has completed by determining whether or not the aforementioned control signal has been input from the DPU 12. In the particular embodiment shown in FIG. 11, the CPU 11 stands by until time x4 since the stop-down operation completes at time x3 and the mirror-up operation completes at time x4.

Immediately after both the mirror-up operation and the stop-down operation are completed (if YES at step S17), it is determined whether or not an exposure operation of the DSP 13 has been started (step S19). Whether or not the exposure operation of the DSP 13 has been started is determined by determining whether or not the CPU has received an exposure operation start signal from the DSP 13. If the exposure operation of the DSP 13 has not been started (if NO at step S19), control waits until the exposure operation of the DSP 13 is started. If the exposure operation of the DSP 13 has been started (if YES at step S19), a shutter control process (shown in FIG. 7) is performed (step S21). In the shutter control process, the shutter leading curtain 73 starts traveling (time x5 in FIG. 11), and the shutter trailing curtain 74 starts traveling immediately after a lapse of the sum of the first exposure time t1 and the second exposure time t2 from the commencement of travel of the shutter leading curtain 73 (time x12 in FIG. 11). During the time from the commencement of travel of the shutter leading curtain 73 to the commencement of travel of the shutter trailing curtain 74 (from time x5 to time x12 in FIG. 11), the DSP 13 obtains two accumulated charges with different exposure times (the first accumulated charge and the second accumulated charge that are accumulated in the CMOS image sensor 62 for the first exposure time t1 and the second exposure time t2, respectively) from the CMOS image sensor 62.

Upon completion of the shutter control process, it is determined whether or not the exposure operation of the DSP 13 has been terminated (step S23). If the exposure operation of the DSP 13 has not been terminated (if NO at step S23), control waits for the exposure operation of the DSP 13 to be terminated. The CPU 11 detects whether or not the exposure operation of the DSP 13 has been terminated by determining whether or not an exposure operation termination signal has been received from the DSP 13. Upon completion of the exposure operation of the DSP 13 (if YES at step S23), a mirror-down operation which is performed via the mirror motor driver 35 and the mirror motor 36, an aperture-restoring control operation which is performed via the DPU 12 and the control circuit 23, and a shutter charge operation are performed (step S25; time x16 in FIG. 11). On completion of the operation at step S25, the release interrupt process completes.

FIG. 7 is a flow chart showing the shutter control process performed at step S21. In this process, firstly the first exposure time t1 of the CMOS image sensor 62 and the second exposure time t2 are set so that the sum of the first exposure time t1 and the second exposure time t2 becomes the correct exposure time T (step S31).

Subsequently, the passage of current through the shutter leading curtain magnet 43 is stopped to bring the shutter leading curtain 73 to travel while an exposure timer 11d is started, and information on the commencement of travel of the shutter leading curtain 73 is sent to the DSP 13 (step S33; time x5 in FIG. 11). Subsequently, if the value of the exposure timer 11d has not reached the total exposure time T (if NO at step S35), control waits until the value of the exposure timer 11d reaches the total exposure time T. During this standby (exposure time), the DSP 13 readouts the first accumulated charge that is accumulated in the CMOS image sensor 62 through the first exposure time t1. Thereafter, upon the value of the exposure timer 11d reaching the total exposure time T (if YES at step S35; time x12 in FIG. 11), the passage of current through the shutter trailing curtain magnet 44 is stopped to cause the shutter trailing curtain 74 to travel (step S37; time x12 in FIG. 11), and control waits until the shutter trailing curtain 74 reaches the travel completion position thereof (if NO at step S39). Upon completion of the travel of the shutter trailing curtain 74 (if YES at step S39), information on the completion of travel of the shutter trailing curtain 74 is sent to the DSP 13 (time x14 in FIG. 11) and control proceeds to the release interrupt process at step S23.

FIG. 8 is a flow chart showing an image processing process which is performed by the DSP 13. The image processing process remains in a standby state until the pre-mirror-up communication (step S11 in the release interrupt process shown in FIG. 6) is performed (if NO at step S41), and control proceeds to step S43 to start the operations at steps S43 through S55 immediately after the DSP 13 receives exposure control information via the pre-mirror-up communication (if YES at step S41). The exposure control information received via the pre-mirror-up communication includes information on the first exposure time t1 and that exposure is controlled in the twice-exposure mode. The DSP 13 carries out an exposure control with the exposure time t1 in the twice-exposure mode designated by the CPU 11.

At step S43 the CMOS image sensor 62 is turned ON to bring all the unit cells 62X into an exposable state. Subsequently, an internal timing which is generated by the timing generator 13c that is incorporated in the DSP 13 is set (step S45) and the aforementioned exposure operation start signal is sent from the DSP 13 to the CPU 11 (step S47).

Immediately after the exposure operation of the DSP 13 is started, a twice-exposure control process for controlling exposure of the CMOS image sensor 62 in the twice-exposure mode is performed (step S49). In the twice-exposure control process, the charge readout control of the CMOS image sensor 62 is performed in conjunction with the shutter control of the CPU 11 so that the exposure times of all the unit cells 62X of the CMOS image sensor 62 become uniform, and the first accumulated charge and the second accumulated charge, that are accumulated in the CMOS image sensor 62 for the first exposure time t1 and the second exposure time t2, respectively, are obtained.

On completion of the twice-exposure control process, the exposure operation termination signal is sent from the DSP 13 to the CPU 11 and the power of the CMOS image sensor 62 is turned OFF (step S51). Subsequently, the two images of different exposure times obtained in the twice-exposure control process (an image of the first accumulated charge and an image of the second accumulated charge) are synthesized to create a picture image with an improved dynamic range (step S53). Thereafter, the picture image thus created is written into the image memory 64 and concurrently indicated on the image monitor 63 (step S55).

On completion of the operation at step S55, the image processing process performed by the DSP 13 completes.

FIG. 9 is a flow chart showing the twice-exposure control process that is performed at step S49 in the image processing process shown in FIG. 8. In this process, firstly it is determined whether or not the shutter leading curtain 73 has started traveling (step S61), and control waits until the shutter leading curtain 73 starts traveling (if NO at step S61). Whether or not the shutter leading curtain 73 has started traveling is determined by determining whether or not the DSP 13 has received information on the commencement of travel of the shutter leading curtain 73 from the CPU 11.

Immediately after the shutter leading curtain 73 starts traveling (if YES at step S61; time x5 in FIG. 5), the shutter position flag is cleared while a shutter-position-detection interrupt is enabled (step S63). Upon the shutter-position-detection interrupt being enabled, the DSP 13 performs a shutter-position-detection interrupt process (shown in FIG. 10; time x6 through time x10 in FIG. 11) every time inputting a pulse from the charge-readout-control photo-interrupter 75.

In the shutter-position-detection interrupt process, the shutter position flag is updated and a charge-readout timing table which corresponds to the travel speed of the shutter leading curtain 73 is set. The charge-readout timing table is made as a table which indicates the timing (standby time) of readout of an electric charge from each unit cell 62X of the CMOS image sensor 62 in accordance with the travel speed of the shutter leading curtain 73.

Subsequently, it is determined whether or not the edge 73a of the shutter leading curtain 73 has reached the first shutter position P1 (step S64). The position of the shutter leading curtain 73 is detected from the shutter position flag set in the above-noted shutter-position-detection interrupt process. Control stands by if the edge 73a of the shutter leading curtain 73 has not yet reached the first shutter position P1 (if NO at step S64). Upon the edge 73a of the shutter leading curtain 73 reaching the first shutter position P1 (if YES at step S64), a charge readout timer 13d for readout of electric charge from the CMOS image sensor 62 is started (step S65).

Subsequently, it is determined whether or not the value of the charge readout timer 13d started at step S65 has reached the first exposure time t1 (step S67). If the value of the charge readout timer 13d has not yet reached the first exposure time t1 (if NO at step S67), control waits until the value of the charge readout timer 13d reaches the first exposure time t1.

Upon the value of the charge readout timer 13d reaching the first exposure time t1 (if YES at step S67; time x11 in FIG. 11), a first charge readout process is performed (steps S69, S71 and S73). Firstly, based on the currently-set charge-readout timing table, the DSP 13 sequentially reads out accumulated charges of the unit cells 62X in the $n^{th}$ row from the side closer to the output portion 62O while comparing the charge-readout timing table with the value of the charge readout timer 13d (step S69). In this operation, "n" which designates the number of the row of unit cells 62X of the CMOS image sensor 62 is a natural number. The initial value of "n" is set to 1. Subsequently, it is determined whether or not the first charge readout process has completed on all the unit cells 62X (step S71). If the first charge readout process has not completed on all the unit cells 62X (if NO at step S71), "n" is increased by one (step S73) and control returns to step S69. Whether or not the first charge readout process has completed on all the unit cells 62X is determined by determining whether or not the number n of the row of unit cells 62X reaches the number of all rows of unit cells 62X. The DSP 13 obtains the first accumulated charge that is accumulated in the CMOS image sensor 62 for the first exposure time t1 by repeating the first charge readout process at steps S69, S71 and S73 until the first charge readout process completes on all the unit cells 62X. At each unit cell 62X, the second exposure starts in synchronization with the completion of readout of the first accumulated charge.

Immediately after the first charge readout process has completed on all the unit cells 62X (If YES at step S71; time x13 in FIG. 11), the shutter-position-detection interrupt is disabled (step S75) and it is determined whether or not the traveling operation of the shutter trailing curtain 74 has completed (step S77). Whether or not the traveling operation of the shutter trailing curtain 74 has completed is determined by determining whether or not the DSP 13 has received the information on the completion of travel of the shutter trailing curtain 74 from the CPU 11. If the traveling operation of the shutter trailing curtain 74 has not completed (if NO at step S77), control waits until the traveling operation of the shutter trailing curtain 74 completes. Upon completion of the traveling operation of the shutter trailing curtain 74 (if YES at step S77; time x14), a second charge readout process is performed (step S79; time 15 in FIG. 11). Since the second exposure of the CMOS image sensor 62 has completed at the moment at which the shutter trailing curtain 74 covers each unit cell 62X, electric charges accumulated in all the unit cells 62X of the CMOS image sensor 62 are read out at once. The charge readout order in the second charge readout process is the same as that in the first charge readout process. Thereby the DSP 13 obtains the second accumulated charge that is accumulated for the second exposure time t2. After completion of the readout of the second accumulated charge, control proceeds to step S51 in the image processing process.

FIG. 10 is a flow chart showing the shutter-position-detection interrupt process. Immediately after the shutter leading curtain 73 starts traveling, the charge-readout-control photo-interrupter 75 outputs a pulse each time the edge 73a of the shutter leading curtain 73 passes each of the shutter positions P1 through P5. The shutter-position-detection interrupt process commences upon the DSP 13 inputting a pulse from the charge-readout-control photo-interrupter 75.

Firstly, it is determined whether or not the shutter position flag is cleared (step S81). The time it is determined at step S81 that the shutter position flag is cleared is when the shutter-position-detection interrupt process is carried out for the first time since the commencement of travel of the shutter leading curtain 73, i.e., when the DSP 13 inputs a first pulse from the charge-readout-control photo-interrupter 75 (time x6 in FIG. 11). If the shutter position flag is cleared (if YES at step S81), the shutter position flag is set to P1 and a between-P1-and-P2 charge-readout timing table is provisionally set in accordance with the elapsed time from the moment the shutter leading curtain 73 starts moving from the travel commencement position thereof to the moment the edge 73a of the shutter leading curtain 73 reaches the first shutter position P1, i.e., in accordance with the travel speed of the shutter leading curtain 73 (step S83), and thereupon the first shutter-position-detection interrupt process completes and control returns.

If the shutter position flag is not cleared (if NO at step S81), it is determined whether or not the shutter position flag is P1 (step S85). The time it is determined at step S85 that the shutter position flag is P1 is when the shutter-position-detection interrupt process for the second time is carried out after the edge 73a of the shutter leading curtain 73 reaches the second shutter position P2, i.e., when the DSP 13 inputs a second pulse from the charge-readout-control photo-interrupter 75 (time x7 in FIG. 11). If the shutter position flag is P1 (if YES at step S85), the shutter position flag is set to P2, the between-P1-and-P2 charge-readout timing table is set and a between-P2-and-P3 charge-readout timing table is provisionally set in accordance with the elapsed time from the moment the edge 73a of the shutter leading curtain 73 reaches the first shutter position P1 to the moment the edge 73a of the shutter leading curtain 73 reaches the second shutter position P2, i.e., in accordance with the travel speed of the shutter leading curtain 73 (step S87). Thereupon the second shutter-position-detection interrupt process completes and control returns.

If the shutter position flag is not P1 (if NO at step S85), it is determined whether or not the shutter position flag is P2 (step S89). The time it is determined at step S89 that the shutter position flag is P2 is when the shutter-position-detection interrupt process for the third time is carried out after the edge 73a of the shutter leading curtain 73 reaches the third shutter position P3, i.e., when the DSP 13 inputs a third pulse from the charge-readout-control photo-interrupter 75 (time x8 in FIG. 11). If the shutter position flag is P2 (if YES at step S89), the shutter position flag is set to P3, the between-P2-and-P3 charge-readout timing table is set and a between-P3-and-P4 charge-readout timing table is provisionally set in accordance with the elapsed time from the moment the edge 73a of the shutter leading curtain 73 reaches the second shutter position P2 to the moment the edge 73a of the shutter leading curtain 73 reaches the third shutter position P3, i.e., in accordance with the travel speed of the shutter leading curtain 73 (step S91). Thereupon the third shutter-position-detection interrupt process completes and control returns.

If the shutter position flag is not P2 (if NO at step S89), it is determined whether or not the shutter position flag is P3 (step S93). The time it is determined at step S93 that the shutter position flag is P3 is when the shutter-position-detection interrupt process for the fourth time is carried out after the edge 73a of the shutter leading curtain 73 reaches the fourth shutter position P4, i.e., when the DSP 13 inputs a fourth pulse from the charge-readout-control photo-interrupter 75 (time x9 in FIG. 11). If the shutter position flag is P3 (if YES at step S93), the shutter position flag is set to P4, the between-P3-and-P4 charge-readout timing table is set and a between-P4-and-P5 charge-readout timing table is provisionally set in accordance with the elapsed time from the moment the edge 73a of the shutter leading curtain 73 reaches the third shutter position P3 to the moment the edge 73a of the shutter leading curtain 73 reaches the fourth shutter position P4, i.e., in accordance with the travel speed of the shutter leading curtain 73 (step S95). Thereupon the fourth shutter-position-detection interrupt process completes and control returns.

The time it is determined at step S93 that the shutter position flag is not P3 is when the shutter-position-detection interrupt process for the fifth time is carried out after the edge 73a of the shutter leading curtain 73 reaches the fifth shutter position P5, i.e., when the DSP 13 inputs a fifth pulse from the charge-readout-control photo-interrupter 75 (time x10 in FIG. 11). If the shutter position flag is not P3 (if NO at step S93), the between-P4-and-P5 charge-readout timing table is set in accordance with the elapsed time from the moment the edge 73a of the shutter leading curtain 73 reaches the fourth shutter position P4 to the moment the edge 73a of the shutter leading curtain 73 reaches the fifth shutter position P5, i.e., in accordance with the travel speed of the shutter leading curtain 73 (step S97), and thereupon the fifth shutter-position-detection interrupt process completes and control returns.

As can be understood from the above description, in the shutter-position-detection interrupt process, a charge-readout timing table is provisionally set based on the immediately preceding travel speed of the shutter leading curtain 73, and thereafter the charge-readout timing table is determinately set based on the actual travel speed of the shutter leading curtain 73 between adjacent two shutter positions. Therefore, when the elapsed time from the moment the edge 73a of the shutter leading curtain 73 reaches one shutter position (one of P1 through P5) to the moment the edge 73a of the shutter leading curtain 73 reaches the adjacent shutter position can be obtained, the charge readout process can be carried out with a determinate charge-readout timing table that is more precise than a provisional charge-readout timing table. When the first exposure time t1 elapses before this elapsed time is obtained, the charge readout process can be carried out with a provisional charge-readout timing table. This makes it possible to control the charge readout operation with a high degree of precision.

As can be understood from the foregoing, exposure times of all the unit cells 62X can be made uniform to be the first exposure time or the second exposure time because the first accumulated charge, which is accumulated by the photoelectric conversion element 62X1 of each unit cell 62X for the first exposure time t1, is read out, row by row of unit cells 62X in order of the shutter traveling direction with the timing of readout of electric charge (i.e., scanning speed) from the CMOS image sensor 62 being brought in synchronization with the travel speed of the shutter leading curtain 73 immediately after a lapse of the first exposure time t1 from the commencement of travel of the shutter leading curtain 73 and further because the second accumulated charge, which is accumulated by the photoelectric conversion element 62X1 of each unit cell 62X for the second exposure time t2, is read out upon completion of travel of the shutter trailing curtain 74. This control makes it possible to obtain two images of different exposure times by a single shutter release operation to create a photographic image with an improved dynamic range even in a digital camera using a focal-plane shutter.

Although two images of different exposure times are obtained by performing the charge readout operation for reading out accumulated charge from the CMOS image sensor 62 once during exposure in the above illustrated embodiment of the digital camera, more than two images of different exposure times can be obtained by performing the charge readout operation more than once during exposure.

Although the shutter traveling direction corresponds to the vertical direction of the light-receiving sensor surface α of the CMOS image sensor 62 (from top to bottom in the vertical direction with respect to FIG. 3) and also the charge readout direction of the CMOS image sensor 62 corresponds to the vertical direction of the light-receiving sensor surface α of the CMOS image sensor 62 in the above illustrated embodiment of the digital camera, the shutter traveling direction is not limited solely to the vertical direction of the light-receiving sensor surface α of the CMOS image sensor 62 and can be the horizontal direction of the same (horizontal direction as viewed in FIG. 3). The charge readout direction of the CMOS image sensor 62 is made to be coincident with the shutter traveling direction.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A digital camera, comprising:
   a solid-state image pickup device which includes a two-dimensional matrix of unit cells arranged in two directions and can selectively read out electric charges accumulated in said unit cells, each of said unit cells including a photoelectric conversion element;
   a focal plane shutter including a shutter leading curtain and a shutter trailing curtain which move in one of said two directions;
   a timer which measures an exposure time;
   a shutter controller which commences measurement of an exposure time via said timer when said shutter leading curtain starts traveling, and drives said shutter trailing curtain upon said timer completing said measurement of said exposure time;
   a charge readout controller which reads out electric charges accumulated by each unit cell of said solid-state image pickup device during said exposure time at least twice to obtain two images including a first image before said shutter trailing curtain commences traveling upon said shutter leading curtain commencing traveling and a second image upon said shutter trailing curtain commencing traveling; and
   an image synthesizing device which synthesizes the first image of said first accumulated charge with the second image of said second accumulated charge;
   wherein said charge readout controller carries out said electric charge readout for said first image, before said shutter trailing curtain commences traveling, at a scanning speed which is in synchronization with a travel speed of said shutter leading curtain in a same direction of said traveling shutter leading curtain,
   wherein a first exposure time, in said first reading-out of said electric charges before said shutter trailing curtain commences traveling upon said shutter leading curtain commencing traveling, is different from a second exposure time in said second reading-out of said electric charges upon said trailing curtain commencing traveling.

2. The digital camera according to claim 1,
   wherein said charge readout controller sets a readout timing of said solid-state image pickup device so as to vary in accordance with the travel speed of said shutter traveling curtain and to readout in a direction identical to said shutter traveling direction, and sequentially reads out said accumulated charges from said solid-state image pickup device at each row of said unit cells arranged along a direction orthogonal to said shutter traveling direction with said scanning speed being brought in synchronization with said travel speed of said shutter leading curtain.

3. The digital camera according to claim 2, wherein said charge readout controller comprises:
   a position detector for obtaining positional information on said shutter leading curtain; and
   charge-readout timing tables which associate said travel speed of said shutter leading curtain with said timing, wherein said charge readout controller sequentially reads out said accumulated charges from said solid-state image pickup device at each row of said unit cells according to one of said charge-readout timing tables which corresponds to a travel speed of said shutter leading curtain which is calculated from said positional information on said shutter leading curtain.

4. The digital camera according to claim 1,
   wherein said first exposure time is longer than said second exposure time.

5. The digital camera according to claim 1,
   wherein a sum of said first exposure time and said second exposure time is greater than a correct exposure time.

6. The digital camera according to claim 1,
   wherein when reading out accumulated charges from said solid-stage imaging device upon commencement of travel of said shutter leading curtain, said charge readout controller carries out said electric charge readout upon completion of said travel of said shutter trailing curtain.

7. The digital camera according to claim 1,
   wherein said charge readout controller reads out said accumulated charges from said solid-state imaging device at once upon commencement of travel of said shutter trailing curtain.

8. The digital camera according to claim 3,
   wherein said position detector comprises a photo-interrupter.

9. The digital camera according to claim 1,
   wherein said solid-state image pickup device comprises a CMOS image sensor.

10. A digital camera, comprising:
    a solid-state image pickup device which includes a two-dimensional matrix of unit cells arranged in two directions and can selectively read out electric charges accumulated in said unit cells, each of said unit cells including a photoelectric conversion element;
    a focal plane shutter including a shutter leading curtain and a shutter trailing curtain which move in one of said two directions;
    a timer which measures at least a first exposure time in which a first image is obtained before said shutter trailing curtain starts traveling, and subsequently a second exposure time, different from the first exposure time and in which a second image is obtained after said shutter trailing curtain starts traveling;
    a shutter controller which controls operations of said shutter leading curtain and said shutter trailing curtain so that said shutter leading curtain starts traveling at a commencement of measurement of said timer and so that said shutter trailing curtain starts traveling on completion of said measurement of said timer;
    a mid-exposure charge readout controller which sequentially reads out a first accumulated charge accumulated in each of said unit cells for said first exposure time in order of a traveling direction of said shutter leading curtain and said shutter trailing curtain, wherein a scanning speed of readout of electric charge from said solid-state image pickup device for said first image is in synchronization with a travel speed of said shutter leading curtain immediately after a lapse of said first exposure time from commencement of travel of said shutter leading curtain;
    a post-exposure charge readout controller which reads out a second accumulated charge accumulated in each of said unit cells for said second exposure time upon completion of said travel of said shutter trailing curtain, and an image synthesizing device which synthesizes the first image of said first accumulated charge accumulated in said first exposure time with the second image of said second accumulated charge accumulated in said second exposure time;

wherein said first exposure time, in said first reading-out of said electric charges before said shutter trailing curtain commences traveling upon said shutter leading curtain commencing traveling, is different from a second exposure time in said second reading-out of said electric charges upon said trailing curtain commencing traveling.

* * * * *